United States Patent
Haynie et al.

(10) Patent No.: US 12,502,726 B1
(45) Date of Patent: Dec. 23, 2025

(54) CONTINUOUS ROD FEED FOR ADDITIVE FRICTION STIR DEPOSITION

(71) Applicant: Bond Technologies, Inc., Elkhart, IN (US)

(72) Inventors: Timothy John Haynie, Union, MI (US); John Andrew Bosker, South Bend, IN (US); Timothy Wayne Wagler, South Bend, IN (US); Arnold David Wright, Elkhart, IN (US); Kendall James McKenzie, Granger, IN (US)

(73) Assignee: Bond Technologies, Inc., Elkhart, IN (US)

( * ) Notice: Subject to any disclaimer, the term of this patent is extended or adjusted under 35 U.S.C. 154(b) by 0 days.

(21) Appl. No.: 18/917,546

(22) Filed: Oct. 16, 2024

Related U.S. Application Data (60) Provisional application No. 63/544,261, filed on Oct. 16, 2023.

(51) Int. Cl.
*B23K 20/12* (2006.01)
*B23K 20/26* (2006.01)
*B33Y 40/00* (2020.01)

(52) U.S. Cl.
CPC ........ *B23K 20/1215* (2013.01); *B23K 20/122* (2013.01); *B23K 20/26* (2013.01); *B33Y 40/00* (2014.12)

(58) Field of Classification Search
CPC ................ B23K 20/1215; B23K 20/26; B23K 20/122–1295; B33Y 40/00; B33Y 10/00; B33Y 30/00
See application file for complete search history.

(56) References Cited

U.S. PATENT DOCUMENTS

| | | |
|---|---|---|
| 8,397,974 B2 | 3/2013 | Schultz et al. |
| 8,632,850 B2 | 1/2014 | Schultz et al. |
| 8,636,194 B2 | 1/2014 | Schultz et al. |
| 8,875,976 B2 | 11/2014 | Schultz et al. |

(Continued)

FOREIGN PATENT DOCUMENTS

| | | | | |
|---|---|---|---|---|
| CN | 105556008 A | * | 5/2016 | ............. B33Y 50/02 |
| CN | 108817641 A | * | 11/2018 | ........... B23K 20/125 |

(Continued)

*Primary Examiner* — Kiley S Stoner
(74) *Attorney, Agent, or Firm* — Sanders Pianowski LLP (57) ABSTRACT

An apparatus and method for a continuous supply of feedstock for a friction stir additive manufacturing method has a rod supply system that transports feedstock segments to a shuttle. The rod supply system has actuators that are coupled to allow movement of the delivery point of the feedstock. The shuttle indexes the feedstock to be on axis with the spindle and rotates it to match the speed and orientation of the spindle before it makes contact with other feedstock currently being deposited. An upper thrust mechanism moves the feedstock from the shuttle to a one-way collet and applies deposition pressure through the collet while the collet raises. Once raised, the collet then applies deposition pressure to the feedstock and the upper thrust mechanism retracts so the shuttle can index again and present additional feedstock. The process can repeat to continuously supply feedstock until the workpiece is complete.

19 Claims, 11 Drawing Sheets

(56) References Cited

U.S. PATENT DOCUMENTS

| | | |
|---|---|---|
| 8,893,954 B2 | 11/2014 | Schultz et al. |
| 9,205,578 B2 | 12/2015 | Schultz et al. |
| 9,266,191 B2 | 2/2016 | Kandasamy et al. |
| 9,511,445 B2 | 12/2016 | Kandasamy et al. |
| 9,511,446 B2 | 12/2016 | Kandasamy et al. |
| 9,643,279 B2 | 5/2017 | Schultz et al. |
| 9,862,054 B2 | 1/2018 | Kandasamy et al. |
| 9,943,929 B2 | 4/2018 | Schultz et al. |
| 10,105,790 B2 | 10/2018 | Kandasamy |
| 10,583,631 B2 | 3/2020 | Kandasamy et al. |
| 11,117,213 B2 | 9/2021 | Rodriguez et al. |
| 11,311,959 B2 * | 4/2022 | Hardwick ............. C22C 1/0416 |
| 11,642,838 B2 | 5/2023 | Lalande et al. |
| 11,691,201 B2 | 7/2023 | Kandasamy et al. |
| 11,772,188 B1 | 10/2023 | Sargent |
| 12,290,873 B2 * | 5/2025 | Haynie ............. B23K 20/1215 |
| 2010/0147925 A1 * | 6/2010 | Hanlon ................ B23K 20/233 228/2.1 |
| 2012/0009339 A1 * | 1/2012 | Creehan ............ B23K 20/1245 427/180 |
| 2018/0354058 A1 * | 12/2018 | Twelves, Jr. ....... B23K 20/1215 |
| 2020/0306869 A1 * | 10/2020 | Hardwick .......... B23K 20/1215 |
| 2021/0078258 A1 | 3/2021 | Lalande et al. |
| 2021/0146471 A1 * | 5/2021 | Rodriguez ........... B23K 20/128 |
| 2021/0245293 A1 | 8/2021 | Hardwick et al. |
| 2021/0308937 A1 | 10/2021 | Broach et al. |
| 2022/0080522 A1 | 3/2022 | Cox et al. |
| 2022/0176633 A1 | 6/2022 | Hardwick et al. |
| 2023/0146110 A1 * | 5/2023 | Allison et al. |
| 2023/0241838 A1 * | 8/2023 | Birbilis ................... C03B 19/02 264/349 |
| 2023/0264289 A1 * | 8/2023 | Mironets ................ B23P 15/00 228/114.5 |
| 2023/0271278 A1 * | 8/2023 | Zhang ................ B23K 20/106 228/25 |
| 2023/0321917 A1 * | 10/2023 | Steinberg ................ B22F 10/85 700/98 |
| 2023/0356322 A1 * | 11/2023 | Haynie .................. B33Y 30/00 |
| 2025/0196252 A1 * | 6/2025 | Zhou .................. B23K 20/106 |

FOREIGN PATENT DOCUMENTS

| | | | | |
|---|---|---|---|---|
| CN | 112091409 A | * | 12/2020 | ........ B23K 20/1245 |
| CN | 112108756 A | * | 12/2020 | ........ B23K 20/1245 |
| CN | 112388147 A | | 2/2021 | |
| CN | 112496522 A | * | 3/2021 | ........... B23K 20/122 |
| CN | 114178555 A | * | 3/2022 | ............. B33Y 30/00 |
| CN | 114393292 A | * | 4/2022 | ............. B23K 20/26 |
| CN | 114799484 A | * | 7/2022 | ........ B23K 20/1245 |
| CN | 115091025 A | * | 9/2022 | ............. B23K 20/26 |
| CN | 115383281 A | * | 11/2022 | ............. B23K 20/12 |
| CN | 115475967 A | * | 12/2022 | ............. B33Y 10/00 |
| CN | 114393292 B | * | 5/2023 | ........... B23K 20/122 |
| KR | 20100061302 A | * | 6/2010 | ............. B23K 20/26 |
| KR | 101516608 B1 | * | 5/2015 | ............. H01L 24/78 |
| WO | WO-2018002001 A1 | * | 1/2018 | ............. B22F 12/10 |

* cited by examiner

CONTINUOUS ROD FEED FOR ADDITIVE FRICTION STIR DEPOSITION

CROSS REFERENCE TO RELATED APPLICATIONS

This application claims the benefit of Provisional Application Ser. No. 63/544,261, filed on Oct. 16, 2023, the disclosures of which are incorporated by reference.

BACKGROUND OF THE INVENTION

Additive Friction Stir Deposition (AFSD) has previously been demonstrated to be capable of creating large-scale parts (greater than 1 cubic meter build volume) at a much higher rate than other metal additive manufacturing technologies such as Wire Arc Additive and Powder Bed Fusion techniques. Prior systems for AFSD have required periodic stoppage to allow feedstock (rod material) to be reloaded into the spindle or cartridge. This is even the case with AFSD systems that are spool-fed, as the spool will run out and will need to be changed, still resulting in machine downtime. Down-time as well as inconsistencies in the deposited material due to stopping and restarting the process are undesirable and can create quality or reliability problems. Therefore, an improved device is needed.

SUMMARY OF THE INVENTION

The device disclosed herein is capable of maintaining a continuous flow of rod stock into the process without interruption resulting in better process consistency and improved production rate. The device uses a supply of rod segments of consistent geometry that are continuously fed into a loader cartridge. A bulk hopper, such as a bowl feeder, or operator loading station provides properly oriented rod segments to the loader cartridge from a place that is outside of the process envelope and/or equipment enclosure. The loader cartridge supplies the rod segments rotationally oriented and fed into the deposition head one after the other (end to end) while maintaining constant axial force or axial velocity as required by process needs. As a new rod is added into the process, a rod below it is being deposited without interruption. As the lower rod is being consumed, the machine matches the orientation and speed of the new rod and transfers deposition force from a lower thrust mechanism into an upper thrust mechanism. As the upper thrust mechanism takes over, the lower mechanism allows the new rod to be received in a collet. The collet allows force to be applied in the downward direction but allows the rods to be pushed through it without resistance. Once the rod is sufficiently clear of the loading mechanism, a new rod is brought into place behind the previous rod similar to a "hand-over-hand" method. The device thereby enables additive manufacturing of large three-dimensional metal parts without interruption.

BRIEF DESCRIPTION OF THE DRAWINGS

in FIG. 2.

DESCRIPTION OF THE PREFERRED EMBODIMENT

Figure 1:
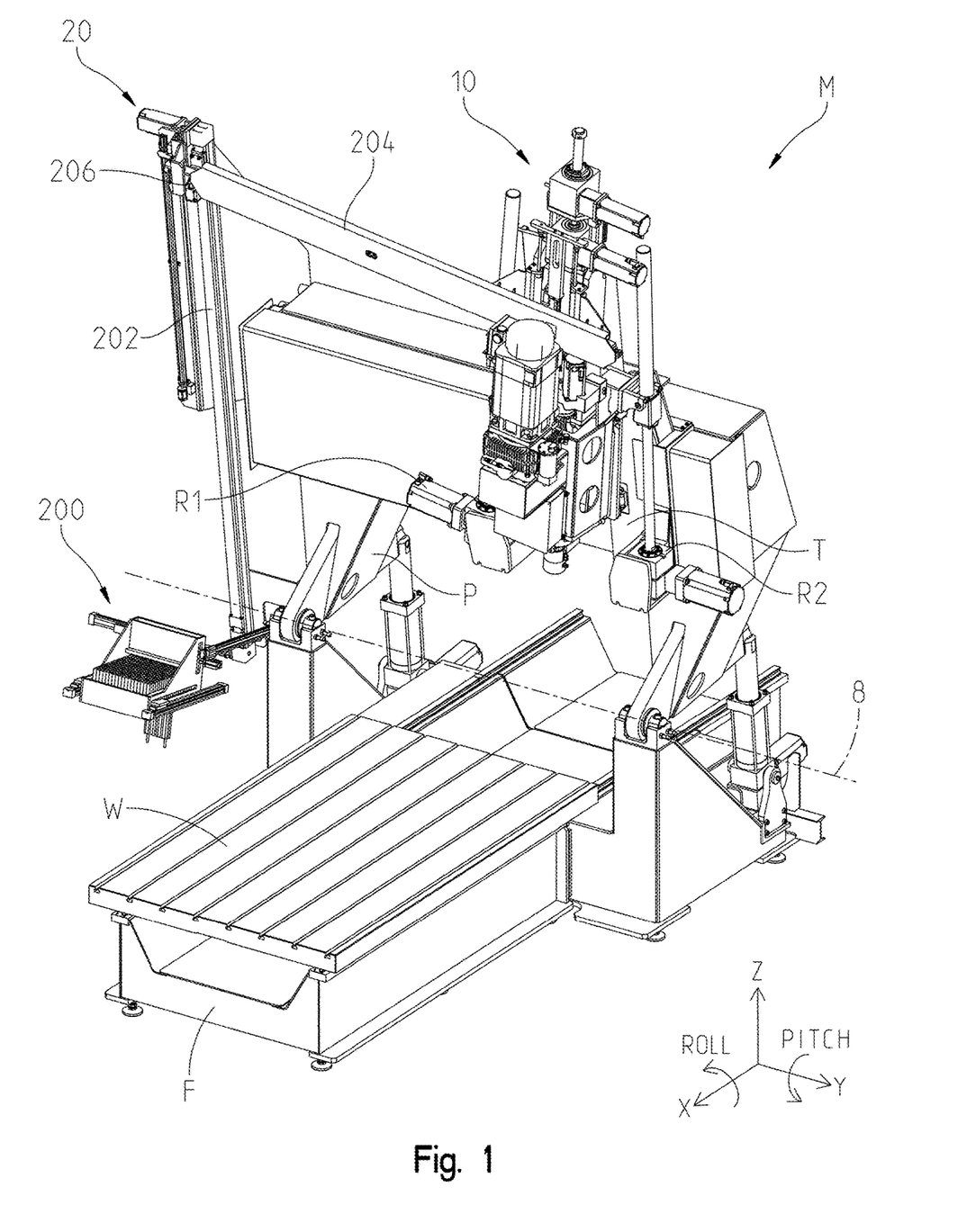
FIG. 1 is an isometric view of an additive manufacturing machine with continuous feed.
Figure 2:
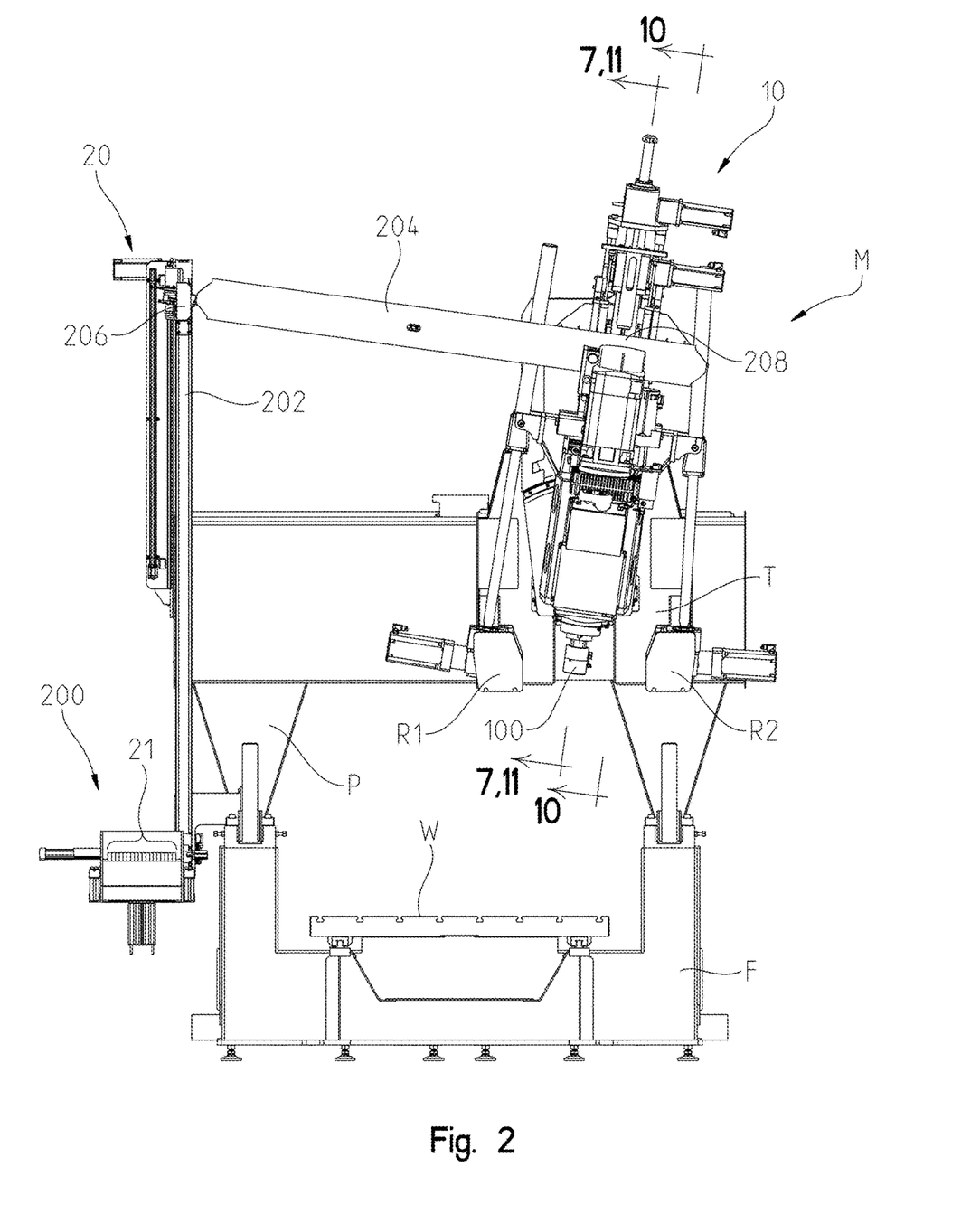
FIG. 2 is a front view of the machine in FIG. 1 showing only the transfer and continuous feed mechanisms.
Figure 3:
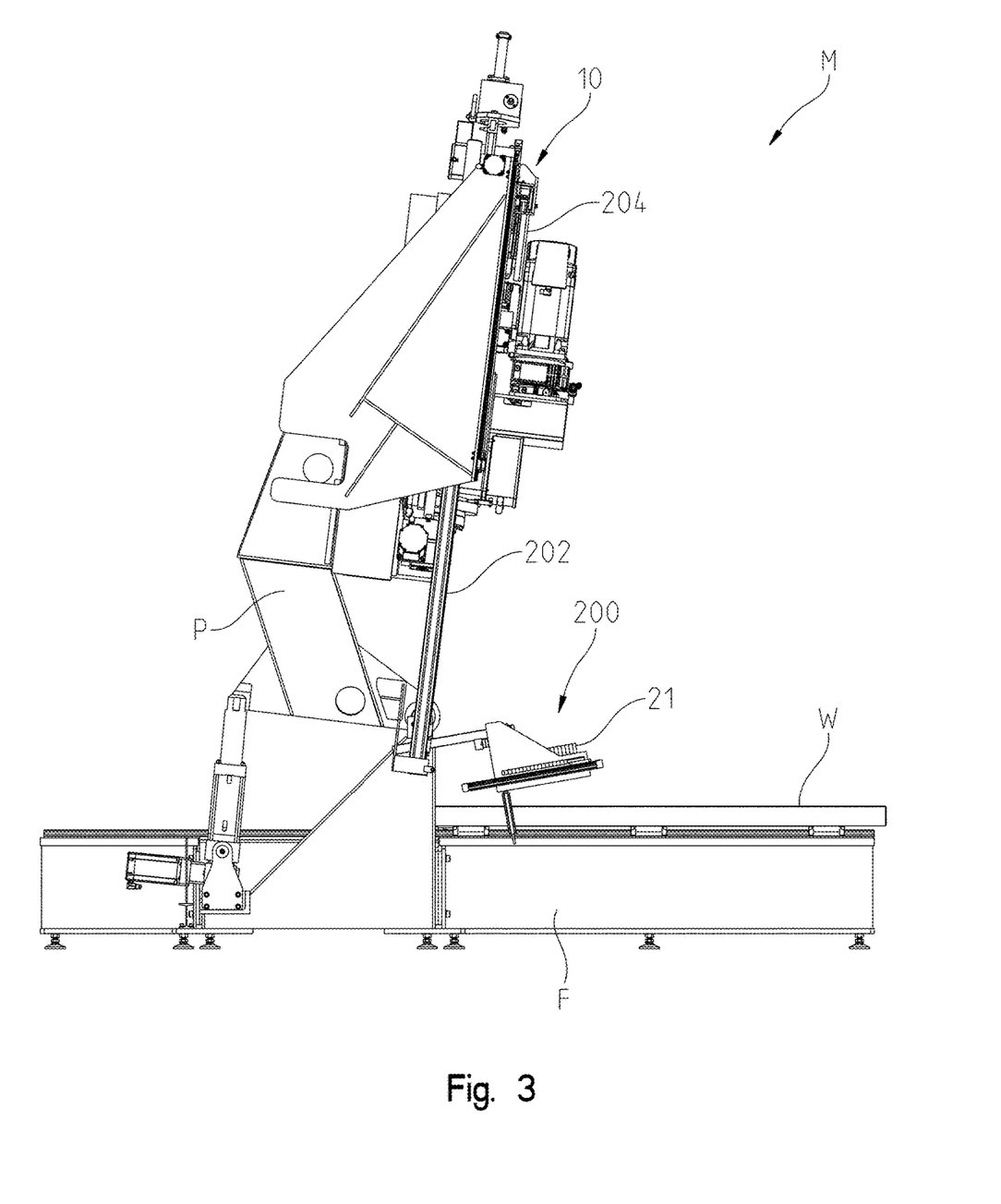
FIG. 3 is a side view of the continuous feed mechanism and spindle shown in FIG. 2.

A continuous feed mechanism 10 is part of a friction stir additive manufacturing machine M shown in FIGS. 1-3. The machine M has a frame F that has a workpiece table W and a pitch frame P that pivots about a pitch axis 8. A traversing mechanism T is attached to the pitch frame P that holds a first and second roll actuators R1, R2. The traversing mechanism T moves horizontally on the pitch frame P. The continuous feed mechanism 10 and spindle 100 are attached to the roll actuators R1, R2 to effect movement in the vertical and angular directions with respect to any workpiece that is located on the workpiece table W. For identification purposes only and not limiting in any way, the workpiece table W moves in the "X" direction, the traversing mechanism T moves in the "Y" direction, and cooperative movement of the roll actuators R1, R2 move the continuous feed mechanism 10 and spindle 100 in the "Z" direction. For angular movement, the pitch frame P is moved through actuators for movement in the "pitch" direction and differential movement of the roll actuators R1, R2 allow movement in the "roll" direction identified in FIG. 1. Any references herein to orientation, location, or position are for identification purposes only and not limiting in any way.

The rod supply system 20 transports the feedstock 21 irrespective of the position or movement of the continuous feed mechanism 10, both operating without having to stop the spindle 100 or deposition process. The feedstock 21 shown herein is a single part with a square cross-sectional shape, but other cross-sectional shapes are contemplated. It is further contemplated that the feedstock consists of multiple rods. For embodiments that use multiple rods, these may be rotated on or off axis when fed and deposited. The holders, grippers, or tooling that interfaces with the feedstock 21 is easily replaceable to accommodate other sizes or shapes of feedstock. The rod supply system 20 consists of the mechanism that transfers feedstock 21 from an operator loading station 200, shown in FIG. 1, to the continuous feed mechanism 10, shown in FIG. 4. The operator loading station 200 is located outside of the process envelope, light curtain, machine enclosure, or restricted area so that feedstock 21 can be replenished without impacting the supply or deposition process. Once bulk quantities of feedstock 21 are placed in the operator loading station 200, a single feedstock 21 is transferred to a vertical linear actuator 202 with part holders, grippers, or similar tooling that can predictably locate and position the feedstock 21. As shown in FIG. 3, the vertical linear actuator 202 is affixed to the pitch frame P so that it can pivot with it about the pitch axis 8, such as when the spindle 100 is pitched with respect to the workpiece table W. As the feedstock 21 travels on the vertical linear actuator 202, it meets a horizontal linear actuator 204 where it is transferred to a rod holder 32. The horizontal linear actuator 204 is also coupled to the vertical linear actuator 202 at a coupling point 206, but the coupling point is not fixed to the vertical linear actuator. The coupling point 206 allows the horizontal linear actuator 204 to pivot with respect to the vertical linear actuator 202. In addition, the coupling point 206 can move vertically along the length of the vertical linear actuator 202, but the distance of the horizontal linear actuator 204 from the vertical linear actuator 202 remains the same. The horizontal linear actuator 204 is coupled to the continuous feed mechanism 10 through linear bearings but it is also not fixed to it. Further, the angle (but not the linear position) of the horizontal linear actuator 204 is fixed with respect to the continuous feed mechanism 10 so that rotation of the mechanism 10 in the roll direction also causes the horizontal linear actuator 204 to rotate. The coupling 208 allows the horizontal linear actuator 204 to slide on the linear bearings, which allows the continuous feed mechanism 10 and spindle 100 to move in the "Y" and "roll" directions. A non-limiting example explaining the movement of the actuators and couplings is as follows: the machine M is shown in FIG. 2 with the continuous feed mechanism 10 positioned in the "Y" direction to the right side and the continuous feed mechanism 10 rotated in the roll direction to a clockwise angle. This locates the horizontal linear actuator 204 at an angle with the coupling point 206 near its vertical limit on the vertical linear actuator 202. If the roll position of the spindle 100 is changed to a counterclockwise angle, the angle of the horizontal linear actuator 204 also changes with it. This causes the coupling point 206 to pivot and slide down the vertical linear actuator 202 while the coupling 208 (and mechanism 10) slide along the horizontal linear actuator 204. The cooperation of the actuators 202, 204 and couplings 206, 208 allow the operator loading station 200 to remain at a fixed location while the delivery point of the feedstock 21 (the mechanism 10) is flexible in any number of directions. The designations of position and orientation in this specification are only for identification purposes and do not represent any limitations for orientation or position. For example, as can be seen in FIGS. 1-3, the horizontal linear actuator 204 and vertical linear actuator 202 do not strictly remain horizontal or vertical.

Figure 4:
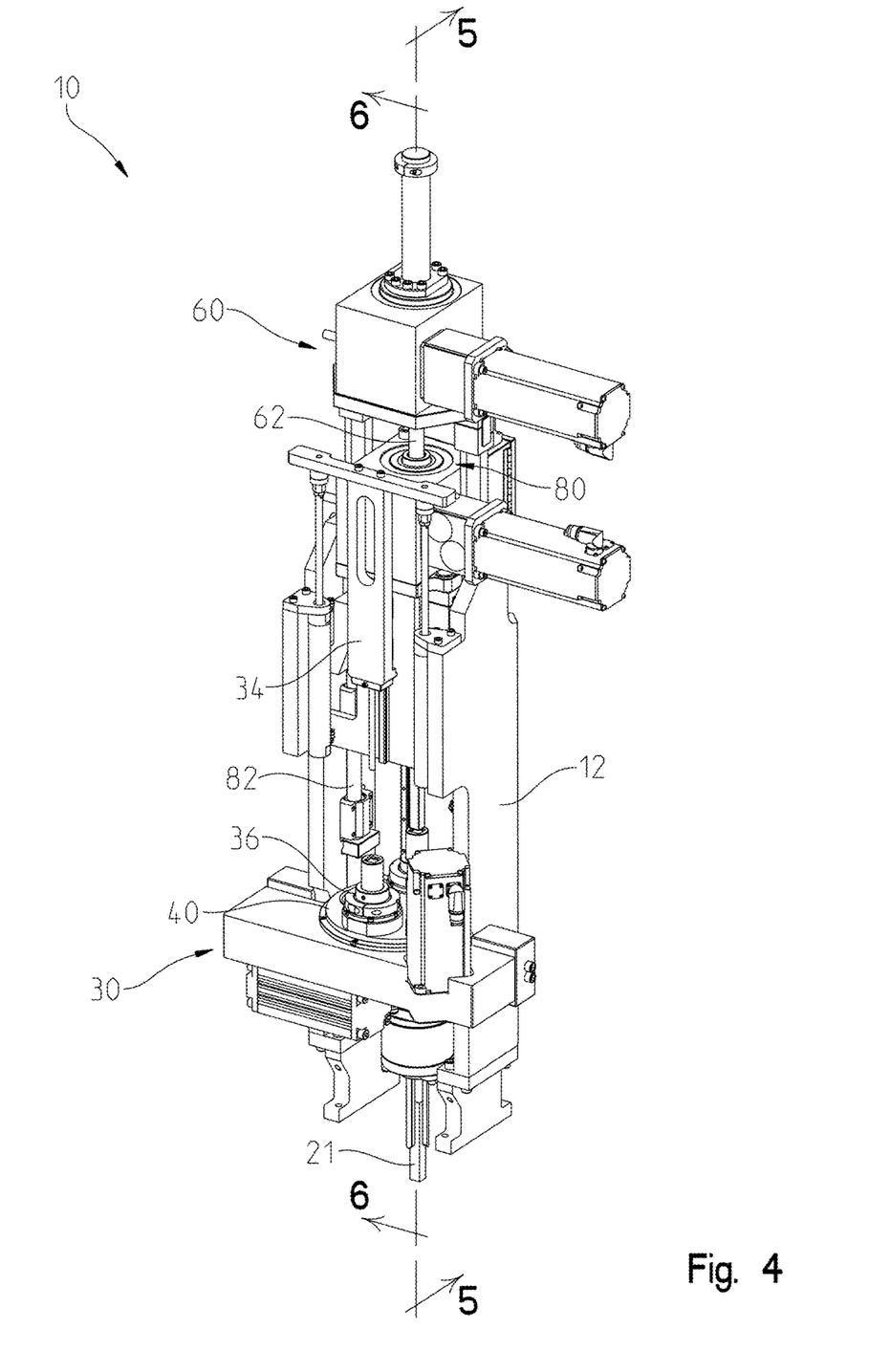
FIG. 4 is an isometric view of the continuous feed mechanism in FIG. 3.

FIG. 4 shows an overview of the continuous feed mechanism 10. Incoming feed stock 21 is delivered to the system in the form of short metal rods of consistent geometry using the rod supply system 20 previously described. As shown, the feedstock 21 are square rods of identical length, but other shapes and lengths are contemplated. The feedstock 21 is located in a rod holder 32 on the horizontal linear actuator 204 where it is moved into position over a loader assembly 30, which is located between an upper thrust mechanism 50 and a lower thrust mechanism 70. Loader cartridges 36 are located on a shuttle 40 that rotates on a shuttle axis 44 that is parallel to the spindle axis/centerline 102, shown in FIG. 7. The shuttle 40 is operated using a shuttle actuator 42 that indexes the loader cartridge 36 (carrying feedstock 21) to the spindle centerline 102 by the loader assembly 30. The loader assembly 30 has two loader cartridges 36 that are indexed between a load/receiving position and a dispatch position. FIG. 8 shows the loader cartridge 36 on the right in the receiving position and the loader cartridge on the left in the dispatch position. In the dispatch position, the loader cartridge 36 is both aligned with and rotatable about the spindle axis 102. A servo motor 38 controls the speed and rotation of the loader cartridge 36 when it is in the dispatch position. Further, the servo motor 38 can independently match the speed and orientation of the spindle 100. First, the feedstock 21 is transferred into a loader cartridge 36 in the receiving position using an insertion cylinder 34. Both loader cartridges 36 include a spring 37, detent, or other feature that retains the position of the feedstock 21 within the cartridge 36 unless acted upon by another device or component. Once the loader cartridge 36 is positioned on the centerline/dispatch position, the feed stock 21 can be moved downward by an upper thrust mechanism 50 which is driven by an upper thrust actuator 60. Once the feed stock 21 is thrust downward into the lower thrust mechanism 70 and gripped by a collet 72 within the lower thrust mechanism, the lower thrust mechanism 70 can be moved downward by the lower thrust actuator 80 and fed into the spindle 100 for friction deposition, as explained in further detail below.

Figure 5:
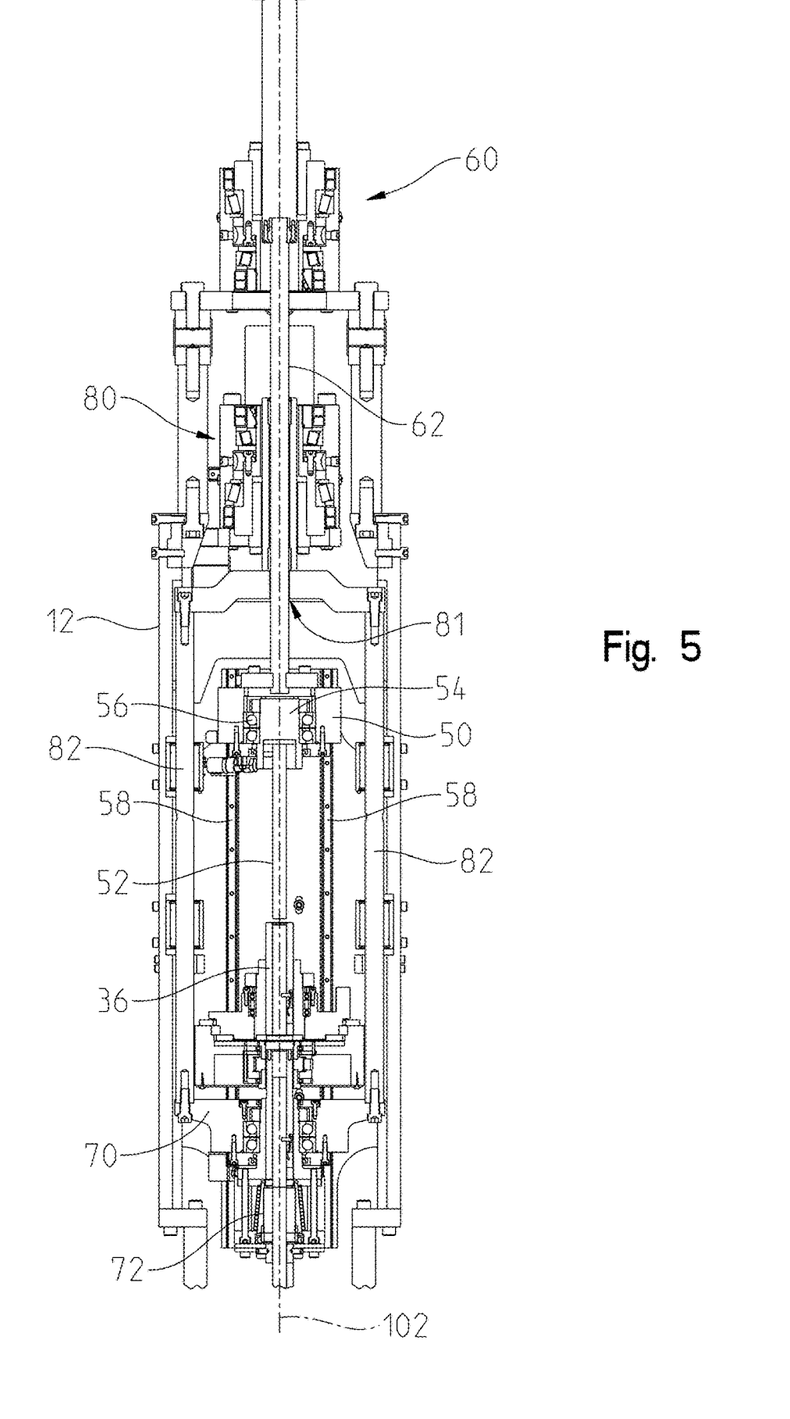
FIG. 5 is a section view 5-5 of the continuous feed mechanism in FIG. 4.

FIG. 5 shows a cross section of the continuous feed mechanism 10 aligned with the spindle axis 102. The relative positioning of the main components is shown with the upper thrust mechanism 50 and upper thrust actuator 60, lower thrust mechanism 70 and lower thrust actuator 80, along with interconnecting components located in their respective raised/start positions.

The upper thrust mechanism 50 is affixed to the upper thrust actuator 60 so that the actuator 60 moves the upper thrust mechanism. The upper thrust mechanism 50 is connected to the frame 12 by linear bearing sets 58, allowing movement along the spindle centerline 102. The mechanism 50 contains a bearing set 56 which is capable of accurately controlling centerline motion while absorbing thrust loads. Within the bearing set 56 is the upper thrust spindle 54. Attached to the upper thrust spindle 54 is a tooling push rod 52. In the FIGS., a single push rod 52 is shown, but for other embodiments that use multiple feedstock, the upper thrust spindle 52 would have push rods that are complementary to the number and shape of feedstock. Because the loader cartridge 36 will begin rotating (or be rotating) when the tooling push rod 52 makes contact, the push rod 52 must be rotatable while applying thrust force. Further, it is contemplated that the push rod 52 is rotated using a motor or other mechanism to rotate the push rod 52, cartridge 36, or feedstock 21. The mechanism 50 can translate up and down in line with the spindle centerline 102 between the raised/start position shown in FIG. 5 and lowered/advanced position. The mechanism 50 is guided by linear guide bearings 58 and driven up or down by the upper thrust actuator 60 through the upper thrust pushrod 62. The tooling push rod 52 pushes the feedstock 21 out of the loader cartridge 36 when the cartridge is in the dispatch position. Within the spindle 100, loader cartridges 36, rod holder 32, collet 72, and other components that contact the feedstock 21 are changeable guides and tooling which is matched to the geometry of the feedstock 21 being utilized.

The upper thrust mechanism 50 could include an upper collet instead of a tooling push rod 52. In an embodiment where the upper thrust mechanism includes an upper collet, the feedstock 21 would be presented above/over the upper collet. The upper collet would raise up to engage with the feedstock and then lower to move the feedstock to the lower thrust mechanism 70 and provide the necessary process force. In this arrangement, the upper collet could rotate to match the orientation and speed of the spindle.

Figure 6:
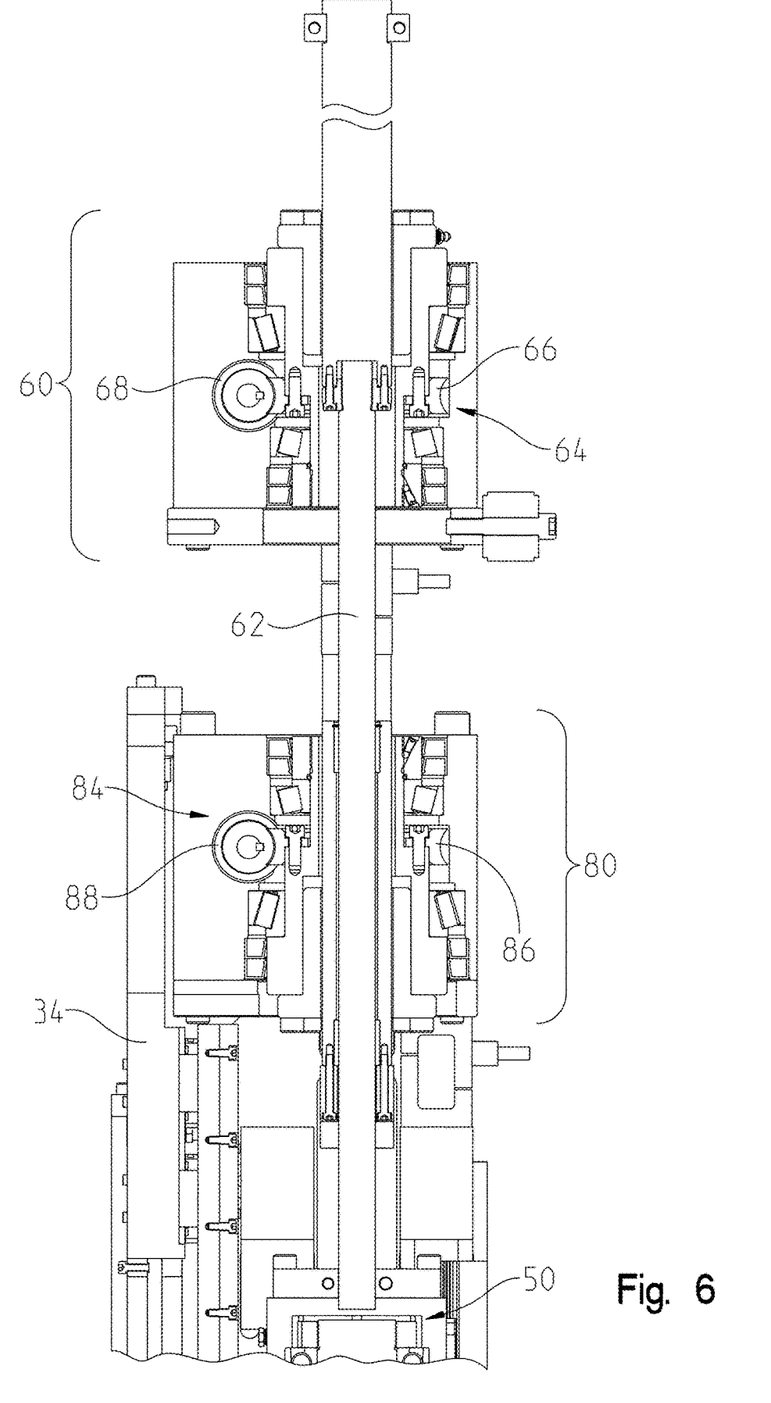
FIG. 6 is an upper section view 6-6 of the continuous feed mechanism in FIG. 4.
Figure 7:
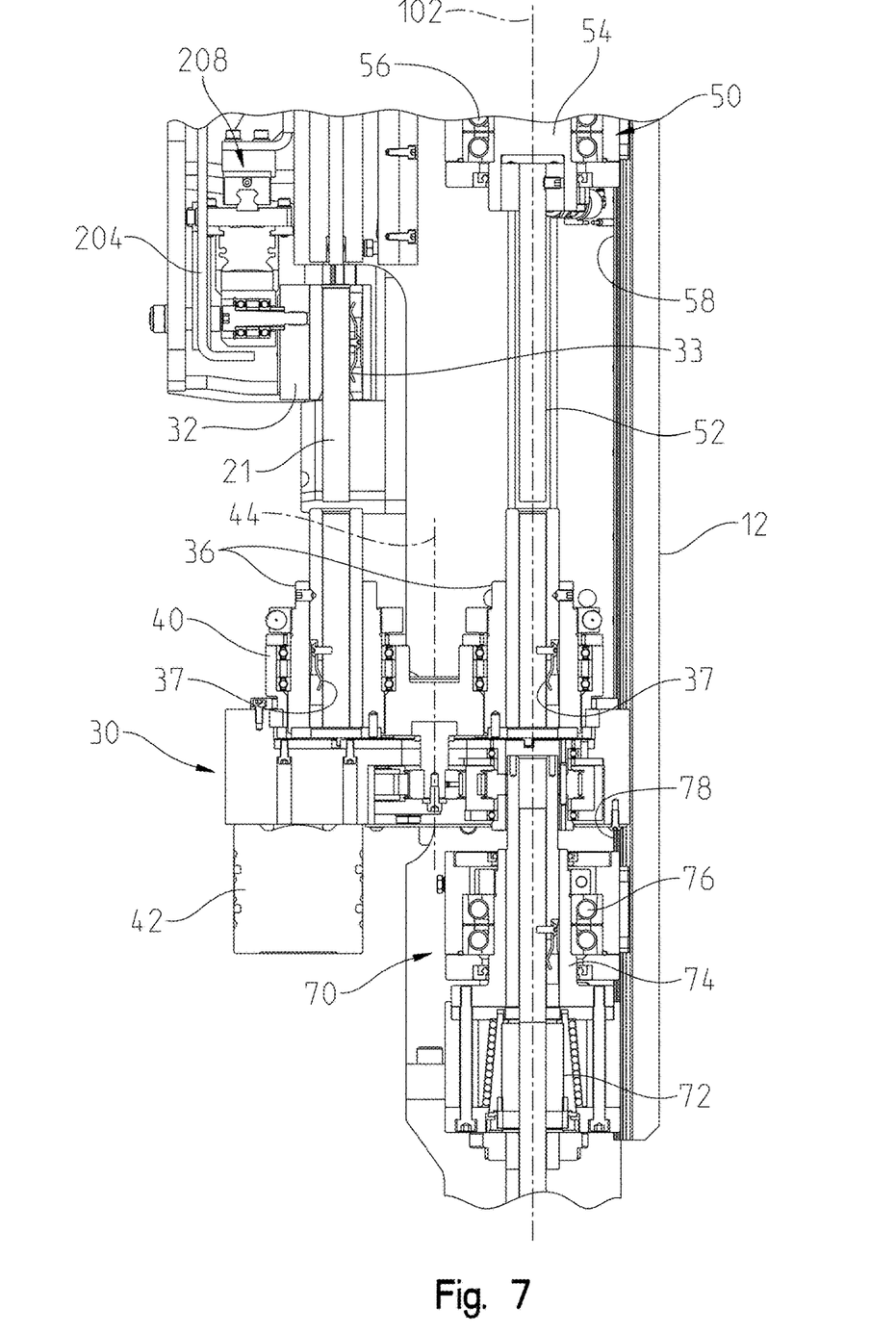
FIG. 7 is a lower section view 7-7 of the continuous feed mechanism in FIG. 2.
Figure 8:
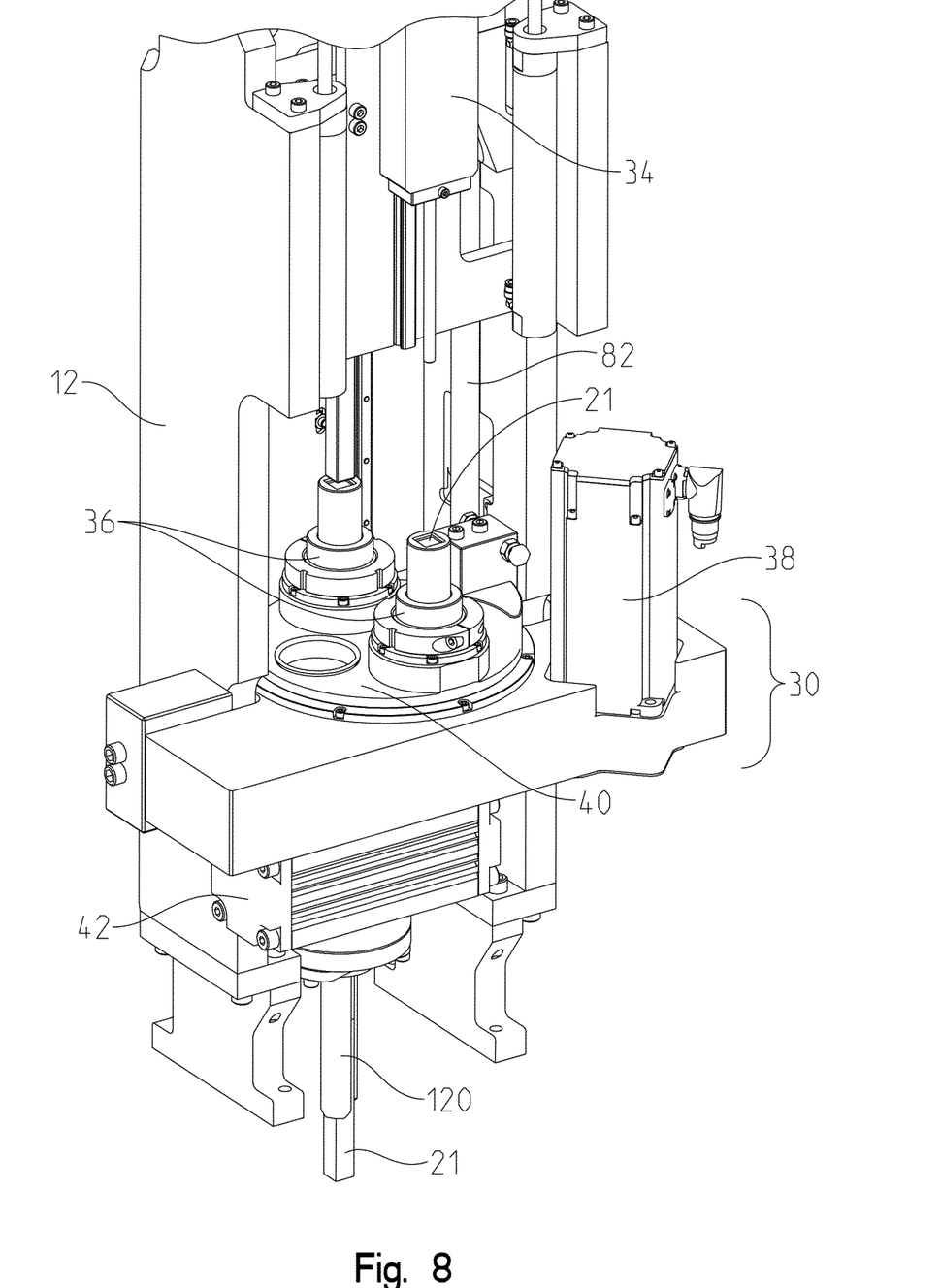
FIG. 8 is a partial right side isometric view of the continuous feed mechanism in FIG. 4.
Figure 9:
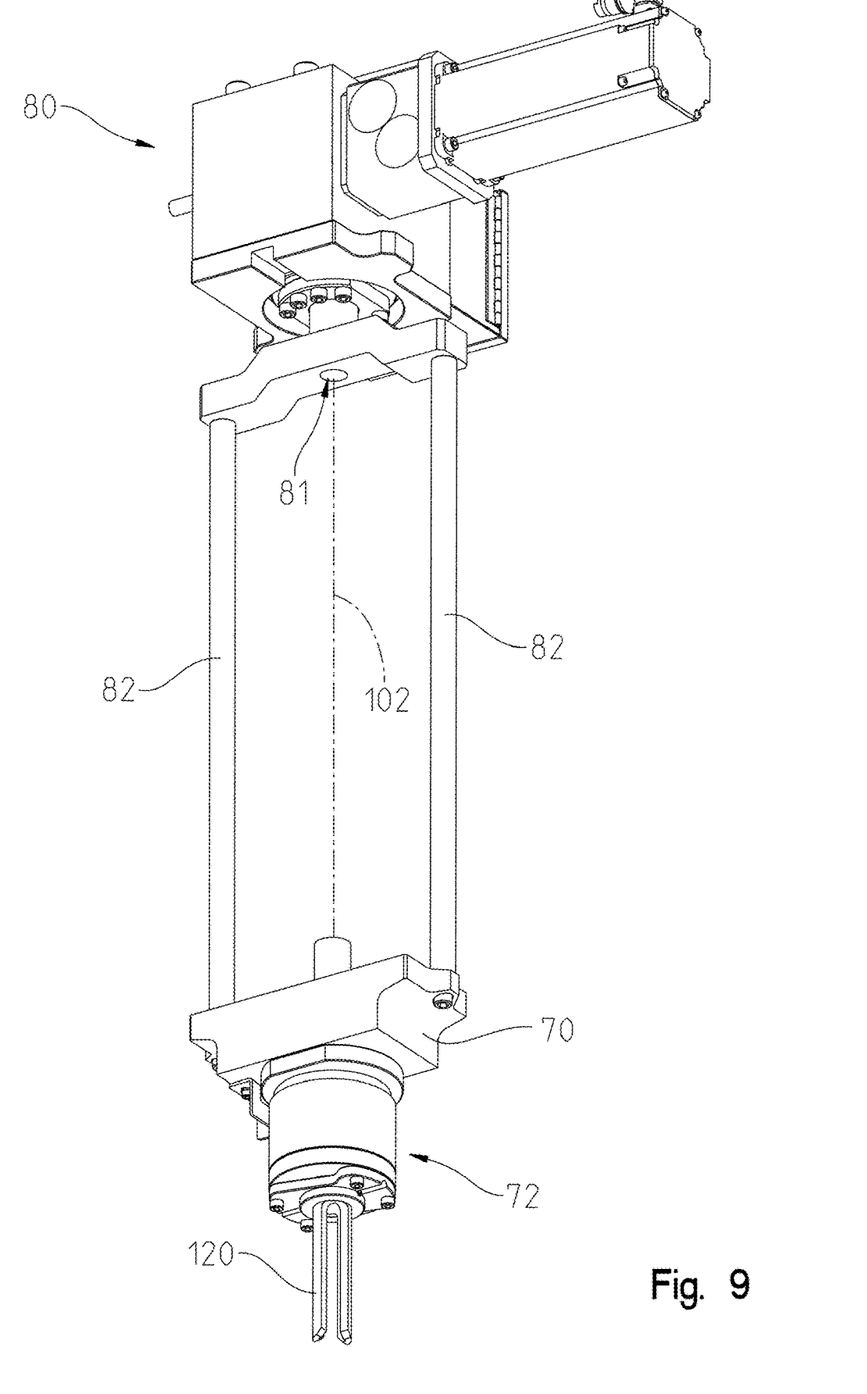
FIG. 9 is an isometric view of the lower thrust actuator and mechanism with the spindle translated along the spindle centerline.

The upper thrust actuator 60 controls the motion of the upper thrust pushrod 62 which is rigidly attached to the upper thrust mechanism 50 shown in FIGS. 6 and 7. The upper thrust actuator 60 is attached to the feed system frame 12. The actuator 60 as shown has a non-rotating ball screw 64 which is coupled to the upper thrust pushrod 62. The ball screw 64 is mounted within a rotatable ball nut 66 which is driven by a worm gear 68 which is coupled to a servo motor. This ball screw mechanism shown herein is only an example of a device that is capable of inducing linear motion up and down on the upper thrust mechanism 50, and other configurations of actuators may be used to accomplish this motion. While not necessary for function, it is preferred that the high thrust loads should be applied through the centerline of the mechanism to minimize undesirable deflection which could contribute to misalignment. Load cells are placed to measure the force on the actuator. These may be placed in the actuator mounting points, in the actuator rod, or anywhere where process force can be accurately measured.

The lower thrust mechanism 70 receives the feedstock 21 as it is moved out of the loader cartridge 36. The lower thrust mechanism 70 is connected to the frame 12 by linear guide bearings 78 which allow only vertical motion between the raised/start position shown in FIG. 5 and lowered/advanced position. The lower thrust mechanism 70 has a lower thrust spindle 74 which is mounted within a bearing set 76 which allows rotation of the spindle while absorbing thrust loads. At the bottom of the lower thrust mechanism 70, a collet mechanism 72 is attached. The collet 72 as shown herein has a 5 degree angle, suitable for gripping feedstock 21 made from soft materials such as aluminum and its alloys, but also for gripping harder materials, such as nickel and its alloys, along with titanium and similar materials. Other angles are contemplated for the collet mechanism provided that the feedstock 21 can be sufficiently gripped when the lower thrust mechanism 70 is providing the process force and that the collet mechanism can release when only the upper thrust mechanism 50 is supplying the process force on the feedstock 21. The collet mechanism 72 grips or releases the feedstock 21 depending upon the direction of relative motion, such that feedstock 21 can be pushed through the collet mechanism 72 in one direction but not the other direction. For example, when the lower thrust mechanism 70 is stationary or moving upward, the upper thrust mechanism 50 is able to push the feedstock 21 down through the collet 72. When the feedstock 21 is moving downward relative to the collet 72, the collet releases, allowing the feedstock 21 to slide through. When the collet 72 begins moving downward relative to the feedstock 21, the downward motion causes the collet 72 to grip the feedstock tightly, thereby creating the force required for the process. As shown, the lower thrust mechanism 70 has a single collet 72, but multiple collets may be implemented based on the feedstock geometry or material, process force needed, or other constraints. It is also contemplated that the collet 72 is assisted by or exclusively driven by an actuator (not shown).

The lower thrust actuator 80 applies the force and motion to the lower thrust pushrods 82. As can be seen in FIG. 5, the lower thrust actuator 80 has a central aperture 81 to allow the upper thrust pushrod 62 to pass through, aligned with the centerline 102 of the spindle. The upper and lower thrust actuators 60, 80 operate independently, so the movement of the upper thrust pushrod 62 has no impact on the lower thrust actuator 80 and vice versa. The lower thrust actuator 80 is attached to the feed system frame 12. It is preferred that the high thrust loads should be applied through the centerline of the mechanism to minimize undesirable deflection which could contribute to misalignment. For this reason, the two pushrods 82 are each offset at an equal distance from the center of thrust and arranged on opposite sides of the centerline 102 such that the two pushrods 82 working together have the net effect of applying a net force that is on the centerline of the device, thereby avoiding undesirable moment loads. The lower thrust pushrods 82 are rigidly attached to the lower thrust mechanism 70 shown in FIG. 5. The lower thrust actuator 80 as shown has a non-rotating ball screw 84 which is coupled to the lower thrust pushrods 82 by a lower thrust plate. The ball screw 84 is mounted within a rotatable ball nut 86 which is driven by a worm gear 88 which is coupled to a servo motor. This mechanism is shown as an example of a device that is capable of inducing linear motion up and down on the lower thrust mechanism 70. Other configurations of actuators may be used to accomplish this motion.

The coordinated movement of the thrust mechanisms 50, 70 is described below. The upper thrust mechanism 50 and the lower thrust mechanism 70 start with both being in the raised/start position. Once the loader assembly 30 has received the feedstock 21 from the rod supply system 20, it is located in the loader cartridge 36 that is in the receiving position. The rotary shuttle assembly 40 then indexes the cartridge 36 (with feedstock 21) to the spindle centerline 102 (the dispatch position) while simultaneously indexing the other loader cartridge 36 (now empty) from the spindle centerline 102 to the receiving position. Once the cartridge 36 (with feedstock 21) is aligned with the centerline, the upper thrust mechanism 50 moves the tooling push rod 52 down, engaging with matching hole(s) in the loader cartridge 36. At this time, the loader cartridge 36 in the dispatch position is not yet spinning. The lower thrust mechanism is moving downward at the programmed speed to prepare applying necessary process/deposition force to feedstock 21 below.

The upper thrust mechanism 50 continues downward motion on the feedstock 21 while the loader cartridge servo motor 38 spins the cartridge 36 to match the rotational speed and clocking/angular position with the lower thrust mechanism 70 and spindle 100 below. Once clocking is matched, the upper thrust mechanism 50 continues to push the feedstock 21 down, and as it enters the lower thrust mechanism 70, it comes in full contact with the feedstock 21 below and takes on the full process force and matches the programmed velocity of the lower thrust mechanism 70. At this time, the process force begins to transfer from the lower thrust mechanism 70 to the upper thrust mechanism 50. It is contemplated that the feedstock geometry or interface tooling in the upper or lower thrust mechanisms contains features that match clocking through structure or geometry, eliminating the need for the motor 38 to spin the cartridge 36 before contact with the feedstock below.

Once the upper thrust mechanism 50 has taken on the full process force, it continues downward. The lower thrust mechanism 70 then reverses direction and starts to move upward, back towards and returning to the start position. The collet 72 automatically releases its grip on the feedstock 21 as it is unable to apply force while moving upward. The lower thrust mechanism moves upward, continuing along the rod until it has reached the start position/top of its stroke.

The upper thrust mechanism 50 continues moving downward while applying full process force. Once the lower thrust mechanism 70 reaches the start position/top of its stroke, the lower thrust mechanism reverses and begins travelling downward, initially at a linear velocity somewhat greater than the linear velocity of the feedstock and upper thrust mechanism. This difference in linear velocity, along with a small preload spring cause the collet mechanism 72 to re-engage and grip the feedstock 21. The lower mechanism continues to push downward until it assumes full process force at the set process velocity. At the point where the process force is transferred back to the lower thrust mechanism 70, the upper thrust mechanism 50 reverses and quickly travels to the start position/top of its stroke to retract the push rod 52 from the loader cartridge 36, thereby allowing it to reload. In any event, the back-and-forth transfer of process force between the upper and lower thrust mechanisms, using load cells, actuators, and a controller, is designed to maintain a consistent process force at the spindle 100 while supplying feedstock 21. All of the deposition force/process force is supplied through the upper and lower thrust mechanisms 70, 50. Once the upper mechanism is disengaged from the lower thrust mechanism 70 and feedstock 21, the cartridge servo motor 38 can decelerate the rotation of the cartridge 36 so that it can return to the receiving position. The upper thrust mechanism 50 is at the top of its stroke and the loader shuttle 40 is set to move the new feedstock rods to the spindle centerline 102 by swapping loader cartridges 36 between the receiving and dispatch position. For clarity, when a loader cartridge 36 moves from the receiving position to the dispatch position, it always will have feedstock 21 for feeding into the lower thrust mechanism 70. When a loader cartridge 36 moves from the dispatch position to the receiving position, it will always be empty. Loader cartridges 36 only move between positions when the upper thrust mechanism 50 is in its start position.

Figure 11:
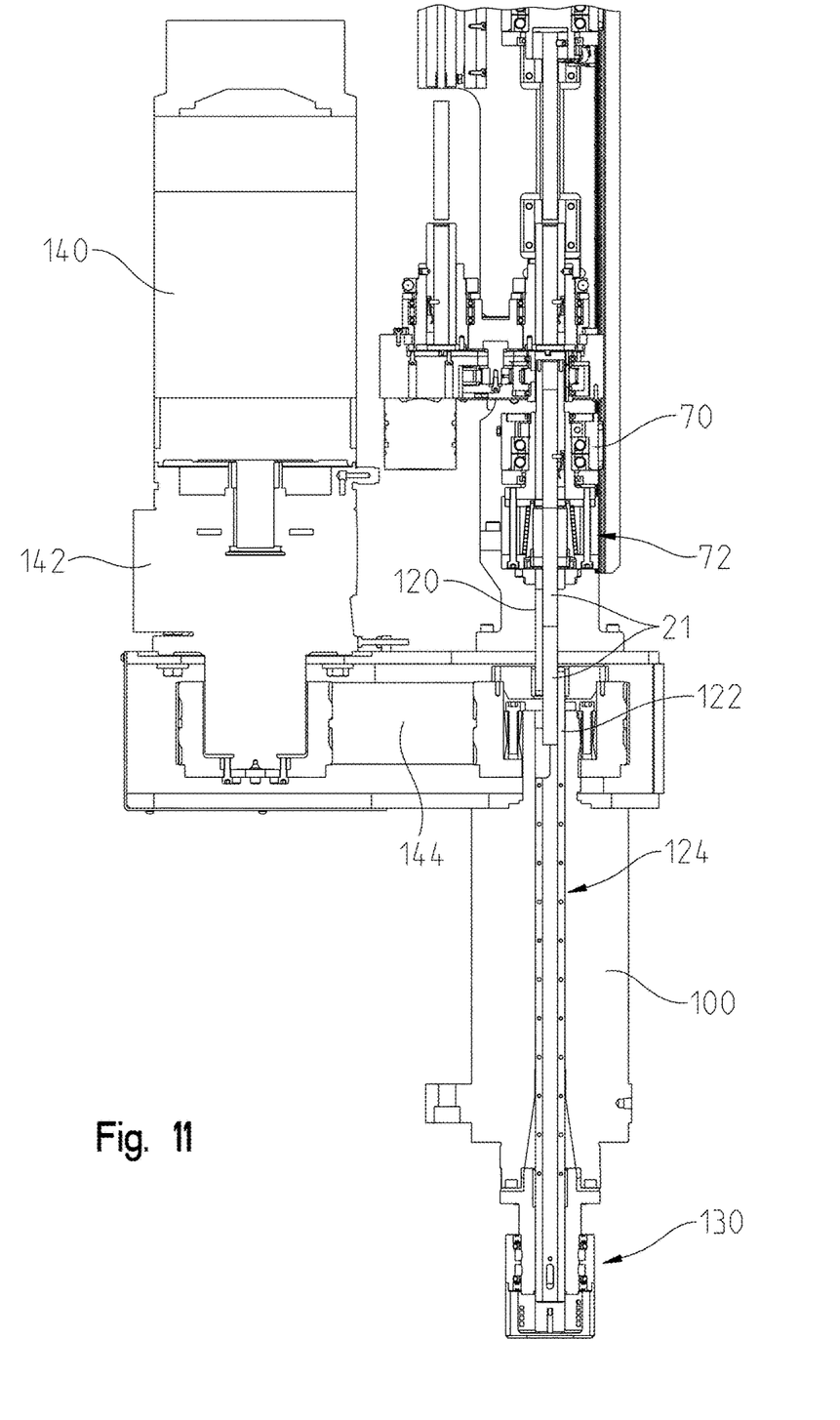
FIG. 11 is a partial side section view 11-11 of the machine in FIG. 2.

FIG. 11 shows the interface between the lower thrust mechanism 70 and the spindle 100. An upper portion 120 of a guide tube 124 which constrains the feedstock 21 as it leaves the continuous feed mechanism and traverses downward through the spindle 100. The spindle 100 has the lower portion 122 of the guide tube. The upper portion 120 and lower portion 122 allow movement of the lower thrust mechanism 70 along the spindle centerline 102 while maintaining the angular relationship of the collet 72 with respect to the spindle 100 to contain and prevent undesirable torsional forces on the feedstock 21. An interior cross section of the guide tube 124 closely matches the geometry of the feedstock such that forces applied to the feedstock rods from the actuators above is transmitted directly to the feedstock 21 within the guide tube. The lower end of the guide tube is attached to a deposition toolholder to which the deposition die 130 is mounted. The deposition toolholder may have cooling channels and fluid supplied to prevent the feedstock material from expanding and plasticizing within the lower portion of the guide tube. These components all rotate with the spindle 100. The lower surface of the deposition die 130 is held at a fixed elevation above the substrate where material is to be deposited. The spindle 100 is rotated using a spindle motor 140 attached to a gearbox 142 that drives a belt 144. The belt 144 couples the motor and gearbox 140, 142 to the spindle 100 while allowing feedstock 21 to move along the centerline 102.

The following description explains the sequence of operation during steady state operation. During start-up, the sequence may vary slightly. The incoming feedstock 21, in the form of short metal rods 21, is supplied in a bulk material hopper, bin, or bowl feeder at the operator loading station 200. The rod supply system 20 takes a single feedstock 21 from the operator loading station 200 to the vertical linear actuator 202. The vertical linear actuator 202 takes the feedstock 21 to where it meets the rod holder 32 on the horizontal linear actuator 204. The horizontal linear actuator 204 takes the feedstock 21 to where it is aligned with the material loader cartridge 36 in the receiving position. If the rod shape is square or other non-round shape, a funneling device may be used above the loader cartridge 36 to allow the rod 21 to transfer into the cartridge with a known orientation.

Figure 10:
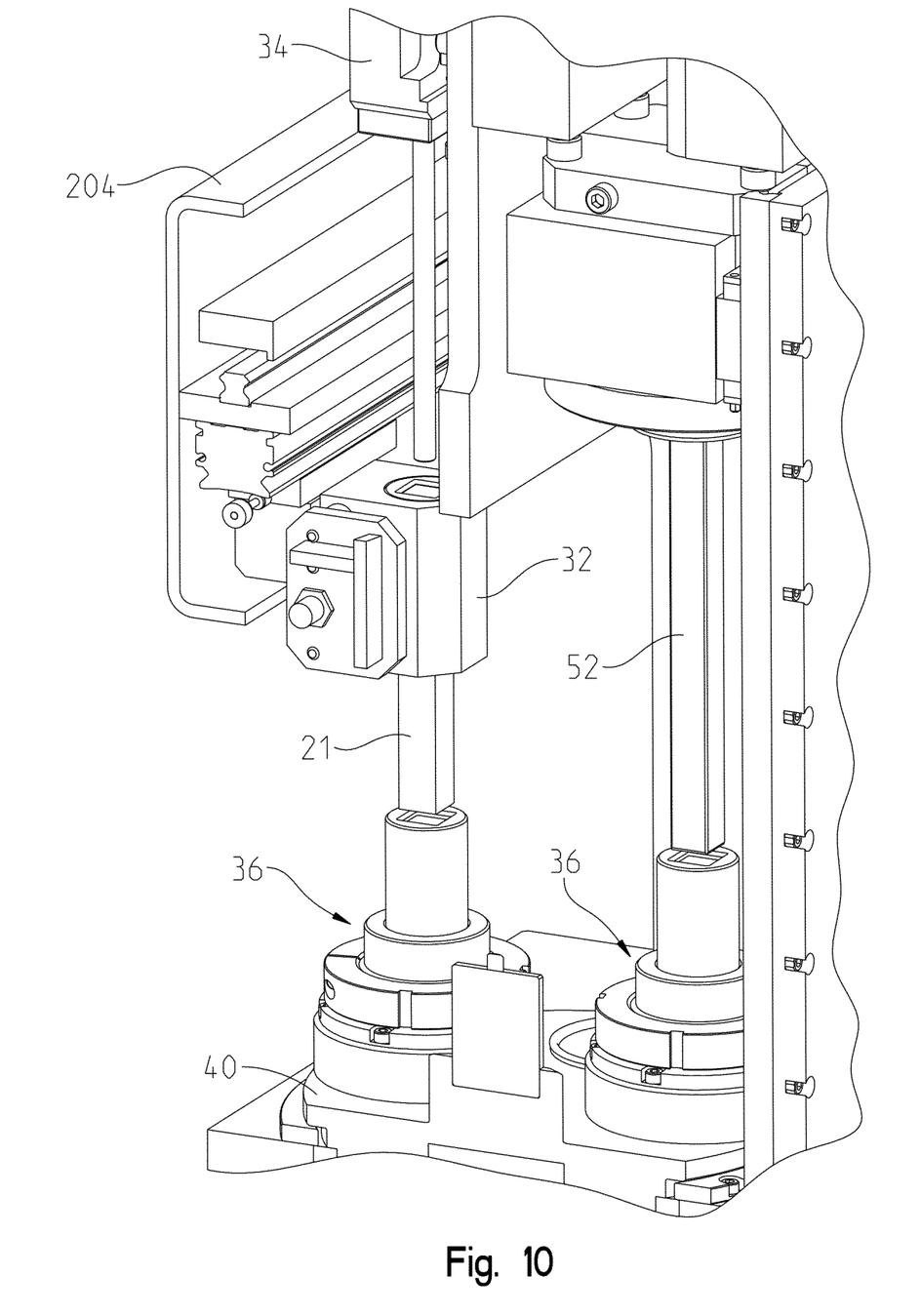
FIG. 10 is a partial rear isometric view 10-10 of the continuous feed mechanism.

Material from the rod supply system 20 is staged in a rod holder 32, shown in FIGS. 7 and 10. The rod holder 32 has capacity to hold the selected geometry and quantity of rods to be fed into the system. The rod holder 32 incorporates a spring detent or gate mechanism 33 to prevent the feedstock 21 from dropping from the rod holder 32 once placed. The rod holder 32 is staged directly above the loader cartridge 36 as shown in FIGS. 7 and 10. Once the loader cartridge 36 is aligned with the rod holder 32, an insertion cylinder 34 is actuated to move the feedstock 21 into the loader cartridge 36. The insertion cylinder 34 retracts, allowing the rod holder 32 to return and await additional feedstock 21 from the vertical linear actuator 202. The rotary shuttle assembly 40 indexes the cartridge 36 from the receiving position where the feedstock 21 is received into a cartridge to a dispatch position on the centerline of the spindle, shown on the right side of FIG. 7.

Once material is in the loader cartridge 36, the shuttle 40 indexes the cartridge 36 into position with its center of rotation in line with the spindle centerline 102, shown in FIG. 7. While the shuttle is indexing, the angular orientation of the loader cartridge 36 is controlled by a pair of tabs that ride in a cam track below the cartridge. The tabs in the cam track engage a known position when the loader cartridge 36 is moved to the dispatch position. This enables the cartridge 36 to be delivered to the spindle centerline 102 in a known orientation which matches the orientation of the push rods/feed stock 21 above. In this manner, square rods, or multiple off-center feedstock rods are aligned with a set of matching holes within the tooling. Once the push rod 52 makes initial engagement with the loader cartridge 36, a servo motor 38 spins the cartridge 36 and push rod 52 to match the speed and orientation of the spindle 100 below.

After the controller has confirmed that the angular orientation and velocity are matched with the spindle's orientation and velocity, the upper thrust mechanism 50 pushes the rod or feedstock 21 out of the loader cartridge 36 and into the guide portion of a lower thrust mechanism 70. Once the leading end of the rod has contacted the trailing end of the prior rod within the lower thrust mechanism, the force on the upper thrust mechanism is increased to the force required for the deposition process. The speed of the upper thrust mechanism 50 is then set to the feed velocity set by the program. The prior rod is already moving downward at this same speed as it is being carried along by the lower thrust mechanism 70, driven by a lower thrust actuator 80.

When the force on the upper thrust mechanism 50 is equal to the process force (a setpoint in the controller for desired deposition properties), the net force on the lower thrust mechanism 70 will be reduced to nearly zero net force. As the upper thrust mechanism 50 continues downward at a constant velocity the lower thrust mechanism 70 begins to move upward and the collet 72 within the lower thrust mechanism automatically releases its grip on the prior feedstock rod, shown in the collet in FIGS. 5 and 7. The prior rod continues its downward motion as it is now being pushed by the incoming rod, which is being pushed by the upper thrust mechanism 50. The collet assembly 72, with its grip released, continues to move upward until it reaches the top of its stroke at which point the upper portion of the collet is near the top of the incoming rod.

When the lower thrust mechanism 70 has reached the top of its stroke, it begins to move downward at a velocity just slightly greater than that of the upper thrust mechanism 50.

A light spring pressure induces initial engagement of the collet with the incoming rod 21 and continued relative motion of the collet increases the collet gripping force and therefore also increases the axial thrusting force. When the thrusting force is equal to the process force, the collet continues moving downward at the feed velocity set by the program. At this point the net force on the upper thrust mechanism 50 should be near zero. When this state is reached as determined by (feedback/force/effort/etc.), the upper thrust mechanism 50 can fully retract to the raised/start position.

With the upper thrust mechanism 50 fully retracted to the start position, shown in FIGS. 5 and 7, a second loader cartridge 36 (which has already been loaded with new feedstock) can be indexed to the spindle centerline 102 where it is ready to be engaged by the pushrods above to continue the process. The empty loader cartridge 36 is simultaneously indexed to the receiving position so that it is ready to receive the next rod or feedstock 21 from the bulk material transport device or rod supply system 20. The loader cartridge 36 is automatically oriented as it moves into position by engagement with the cam track below the cartridge.

Driven from the upper and/or lower thrust mechanisms, the individual feedstock 21 travel axially through the spindle 100, within a changeable guide tube which has an internal geometry to match the cross section shape and quantity of the incoming rods/feedstock 21.

At the bottom of the guide tube is deposition tooling, including a cooling collar 130 shown in FIG. 11. The openings in the upper portion of the die match the shape and number of the guide tubes. The channels through the guide tube may be of uniform cross section, or the channels may enlarge a bit from top to bottom, creating an effective draft angle to allow the material to flow more easily as it is heated and softened by the frictional interface at the substrate and the stirring effect which is kneading the plasticized material below the die.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method for feeding segments of additive material to an additive manufacturing process, said method comprising:
   (a) providing a spindle rotatable about a spindle axis for depositing said segments when a process force is applied to said segments, said spindle having an angular position and rotational speed;
   (b) providing an upper thrust mechanism being moveable in a direction parallel to said spindle axis between a start position and an advanced position;
   (c) providing a lower thrust mechanism being moveable in a direction parallel to said spindle axis between a start position and an advanced position;
   (d) providing a loader cartridge moveable between a receiving position and a dispatch position;
   (e) rotating said loader cartridge on said spindle axis to match said angular position and rotational speed of said spindle while moving said segment from said loader cartridge into said lower thrust mechanism with said upper thrust mechanism;
   (f) providing said segment;
   (g) contacting said segment with said upper thrust mechanism;
   (h) moving said segment into said lower thrust mechanism with said upper thrust mechanism;
   (i) applying said process force with said upper thrust mechanism;
   (j) while said upper thrust mechanism is applying said process force, said lower thrust mechanism moves with respect to said segment along said spindle axis towards said start position; and
   (k) when said lower thrust mechanism reaches said start position, said lower thrust mechanism moves toward said advanced position to transfer said process force to said lower thrust mechanism.

2. The method of claim 1, further comprising repeating ordered steps (f) through (k) for each said segment.

3. The method of claim 1, further providing a shuttle having said loader cartridge and a second said loader cartridge, said shuttle locating one of said loader cartridges in said receiving position when another of said loader cartridges is in said dispatch position.

4. The method of claim 1, further providing a frame having a pitch portion pivotable about a pitch axis, a traversing portion attached to said pitch portion and moveable in a direction parallel to said pitch axis, a roll portion attached to said traversing portion being extendable and rotatable with respect to said traversing portion, said spindle and upper and lower thrust mechanisms are attached to said roll portion, providing a rod supply system comprising: an operation station, a first linear actuator affixed to said pitch portion and pivotable therewith, a coupling point connected to said first linear actuator and slidable with respect thereto, a second linear actuator coupled to said coupling point at one end, said second linear actuator is pivotable with respect to said coupling point, said second linear actuator at a fixed angle with respect to said continuous feed system and slidable with respect thereto, transferring said feedstock from said operator station to said loader cartridge comprising the following steps: transferring said feedstock from said operator station to said first linear actuator, transferring said feedstock from said first linear actuator to said second linear actuator adjacent said coupling point, transferring said feedstock from said second linear actuator to said loader cartridge.

5. The method of claim 1, further providing a collet in said lower thrust mechanism, said collet is fixed from rotation with respect to said spindle, clamping said segment with said collet when said lower thrust mechanism is applying said process force.

6. The method of claim 1, further providing a collet in said upper or lower thrust mechanisms, said collet being configured to apply compressive force to said segment to fix said segment with respect to said collet when said upper or lower thrust mechanism having said collet is applying said process force.

7. A system for feeding a continuous supply of segments to an additive manufacturing die, said continuous feed system comprising:
   a loader assembly having a first loader cartridge for receiving and dispatching said segment, said loader assembly for moving said first loader cartridge between a receiving position and a dispatch position, said dispatch position defined by said first loader cartridge located on a spindle axis;
   an upper thrust mechanism being moveable along said spindle axis between a start position and an advanced position, when said upper thrust mechanism is in said start position, said loader cartridge is moveable between said receiving and dispatch positions;

a lower thrust mechanism being moveable along said spindle axis between a start position and an advanced position, said lower thrust mechanism having a releasable collet for selectively gripping said segment and being rotatable about said spindle axis;

a spindle rotatable about said spindle axis; and said spindle is fixed from rotation with respect to said releasable collet.

8. The system of claim 7, further comprising a frame having a pitch portion pivotable about a pitch axis, a traversing portion attached to said pitch portion and moveable in a direction parallel to said pitch axis, a roll portion attached to said traversing portion being extendable and rotatable with respect to said traversing portion, said continuous feed system is attached to said roll portion.

9. The system of claim 8, further comprising a rod supply system for transferring said segment from an operator station to said loader assembly, said rod supply system comprising:

a first linear actuator affixed to said pitch portion and pivotable therewith;

a coupling point connected to said first linear actuator and slidable with respect thereto;

a second linear actuator coupled to said coupling point at one end, said second linear actuator is pivotable with respect to said coupling point; and said second linear actuator at a fixed angle with respect to said continuous feed system and slidable with respect thereto.

10. The system of claim 7, wherein said collet is self-releasing, when said segment is located within said collet, said segment is axially moveable with respect to said collet in only one direction.

11. The system of claim 7, further comprising a rod coupling an upper thrust actuator to said upper thrust mechanism and a lower thrust actuator coupled to said lower thrust mechanism, said rod extending through said lower thrust actuator and located on said spindle axis.

12. The system of claim 7, further comprising a motor for rotating said loader cartridge about said spindle axis when said loader cartridge is in said dispatch position.

13. The system of claim 7, wherein said upper thrust mechanism has a push rod, said push rod is rotatable about said spindle axis, when said upper thrust mechanism is in said advanced position, said push rod extends through said loader cartridge.

14. The system of claim 7, further comprising a second loader cartridge, when one of said first or second loader cartridges is in said receiving position, another of said first or second loader cartridges is in said dispatch position.

15. The system of claim 7, further comprising a motor for rotating said loader cartridge when said loader cartridge is in said dispatch position.

16. A method for feeding segments of additive material to an additive manufacturing process, said method comprising:

providing a continuous feed system including:

a loader cartridge moveable between a receiving position and a dispatch position, said dispatch position defined by said loader cartridge located on a spindle axis;

an upper thrust mechanism being moveable along said spindle axis between a start position and an advanced position, when said upper thrust mechanism is in said start position, said loader cartridge is moveable between said receiving and dispatch positions;

a lower thrust mechanism being moveable along said spindle axis between a start position and an advanced position, said lower thrust mechanism having a releasable collet for selectively gripping said segment, said collet being rotatable about said spindle axis;

a spindle rotatable about said spindle axis, said spindle is fixed from rotation with respect to said collet;

supplying said segments comprising the following steps:

(a) loading said segment into said loader cartridge in said receiving position;

(b) moving said loader cartridge with said segment into said dispatch position;

(c) rotating said loader cartridge on said spindle axis to match an angular position and rotational speed of said spindle while moving said segment from said loader cartridge into said lower thrust mechanism with said upper thrust mechanism;

(d) moving said upper thrust mechanism from said start position toward said advanced position to move said segment towards said lower thrust mechanism;

(e) applying a process force with said upper thrust mechanism when said segment contacts a second said segment;

(f) moving said lower thrust mechanism with respect to said segment towards said start position while said upper thrust mechanism is applying said process force; and (g) transferring said process force to said lower thrust mechanism when said lower thrust mechanism reaches said start position.

17. The method of claim 16, further providing a frame having a pitch portion pivotable about a pitch axis, a traversing portion attached to said pitch portion and moveable in a direction parallel to said pitch axis, a roll portion attached to said traversing portion being extendable and rotatable with respect to said traversing portion, said continuous feed system is attached to said roll portion, providing a rod supply system comprising: a first linear actuator affixed to said pitch portion and pivotable therewith, a coupling point connected to said first linear actuator and slidable with respect thereto, a second linear actuator coupled to said coupling point at one end, said second linear actuator is pivotable with respect to said coupling point, said second linear actuator at a fixed angle with respect to said continuous feed system and slidable with respect thereto, transferring said feedstock from an operator station to said loader cartridge comprising the following steps: transferring said feedstock from said operator station to said first linear actuator, transferring said feedstock from said first linear actuator to said second linear actuator adjacent said coupling point, transferring said feedstock from said second linear actuator to said loader cartridge in said receiving position.

18. The method of claim 16, further comprising the step after step (e) of releasing said collet when said upper thrust mechanism is supplying said process force.

19. The method of claim 16, further providing a second loader cartridge, when one of said first or second loader cartridges is in said receiving position, another of said first or second loader cartridges is in said dispatch position.

* * * * *